United States Patent
Hu et al.

(10) Patent No.: US 7,534,521 B2
(45) Date of Patent: May 19, 2009

(54) INTEGRAL MULTI-STACK SYSTEM OF FUEL CELL

(75) Inventors: Liqing Hu, Shanghai (CN); Jianwei Xia, Shanghai (CN)

(73) Assignee: Shen-Li High Tech Co., Ltd (Shanghai), Shanghai (CN)

( * ) Notice: Subject to any disclaimer, the term of this patent is extended or adjusted under 35 U.S.C. 154(b) by 490 days.

(21) Appl. No.: 10/769,502

(22) Filed: Jan. 31, 2004

(65) Prior Publication Data
US 2005/0170235 A1 Aug. 4, 2005

(51) Int. Cl.
H01M 8/24 (2006.01)
H01M 2/08 (2006.01)
H01M 8/04 (2006.01)

(52) U.S. Cl. .............................. 429/38; 429/26; 429/35

(58) Field of Classification Search .................. 429/26, 429/35, 38
See application file for complete search history.

(56) References Cited

U.S. PATENT DOCUMENTS 5,486,430 A * 1/1996 Gorbell et al. ............... 429/35
5,773,160 A * 6/1998 Wilkinson et al. ........... 429/13

* cited by examiner

Primary Examiner—Mark Ruthkosky
Assistant Examiner—Karie O'Neill
(74) Attorney, Agent, or Firm—Raymond Y. Chan; David and Raymond Patent Firm (57) ABSTRACT

The invention discloses an integral multi-stack system of fuel cell. The system includes at least one pair of fuel cell stacks, a manifolding functional frame, and an attaching device for securely installing each pair of fuel cell stacks to the manifolding functional frame. Each fuel cell stack has a pair of end plates and six openings including a fuel inlet, an oxidant inlet, a cooling agent inlet, a fuel outlet, an oxidant outlet, and cooling agent outlet all formed on one end plate thereof. When the fuel cell stacks are securely installed onto the manifolding functional frame, each opening thereof is air commnicateable to a sub-passage defined in the body without being communicated with one another and respectively communicated to a plurality of main passages defined in the body, making the main passages and the sub-passages be able to be used to supply and/or discharge gas or liquid being used by all the fuel cell stacks integrated.

13 Claims, 7 Drawing Sheets

FIG 1

Prior Art

INTEGRAL MULTI-STACK SYSTEM OF FUEL CELL

BACKGROUND OF THE PRESENT INVENTION

1. Field of Invention

The present invention relates to fuel cell, and more particularly to an integral multi-stack system of fuel cell which requires low operating air pressure and has low weight, manufacturing cost, and power consumption. Also, the integral multi-stack system can be simply and quickly disconnected for replacement of one or more fuel cell stacks.

2. Description of Related Arts

A fuel cell is an electrochemical energy conversion device that produces electricity and heat during the process of converting hydrogen and oxygen into water. The technology is promising because it offers a means of making power more efficiently with less pollution. Fuel cells are usually classified by the type of electrolyte being used. The proton exchange membrane PEM fuel cell is one of the most promising technologies. This is the type of fuel cell that will be powering cars, buses and houses in future.

Figure 1:
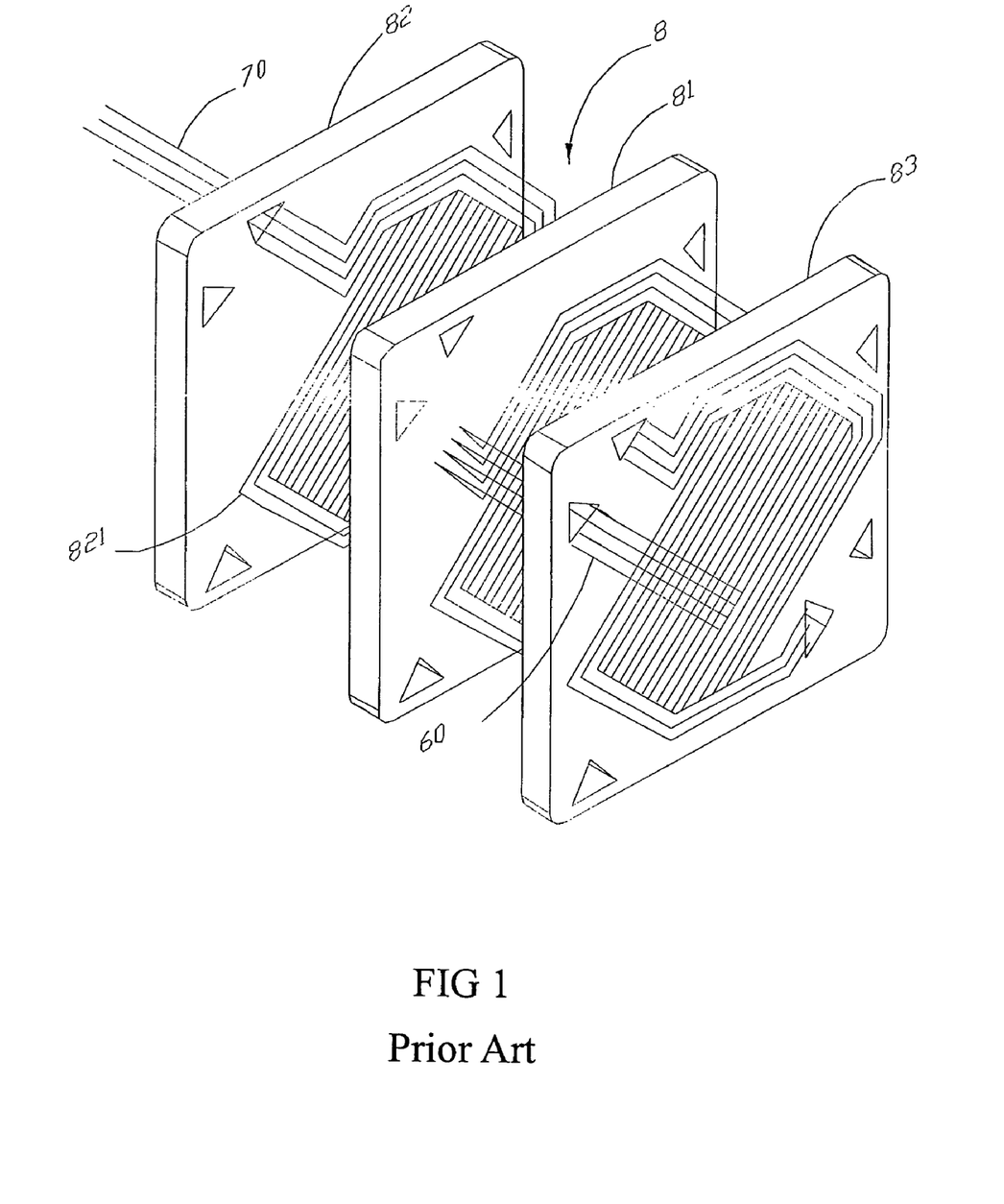
FIG. 1 is a schematic perspective view illustrating the workings of a single PEM fuel cell.

FIG. 1 is a schematic view showing the working of a single PEM fuel cell 8. The single fuel cell 8 comprises a membrane electrode assembly MEA 81, a first field flow plate 82, and a second field flow plate 83. The MEA 81 comprises electrodes anode and cathode; not shown in the FIG. 1 with a thin layer of catalyst, bonded to either side of a PEM. Hydrogen 70 flows through passages 821 defined in the first field flow plate 82 to the anode where a platinum catalyst promotes its separation into protons and electrons. Hydrogen 70 may be supplied to a fuel cell engine directly or can be obtained from natural gas or methanol using a fuel processor.

Air 60, or pure oxygen, is supplied to the cathode of the MEA 81 through a plurality of passages defined in the second flow field plate 83 on a side opposite the viewer. Oxygen in the air 60 attracts the hydrogen protons through the PEM. The air steam also removes water created as a by-product of the electrochemical process.

Figure 2:
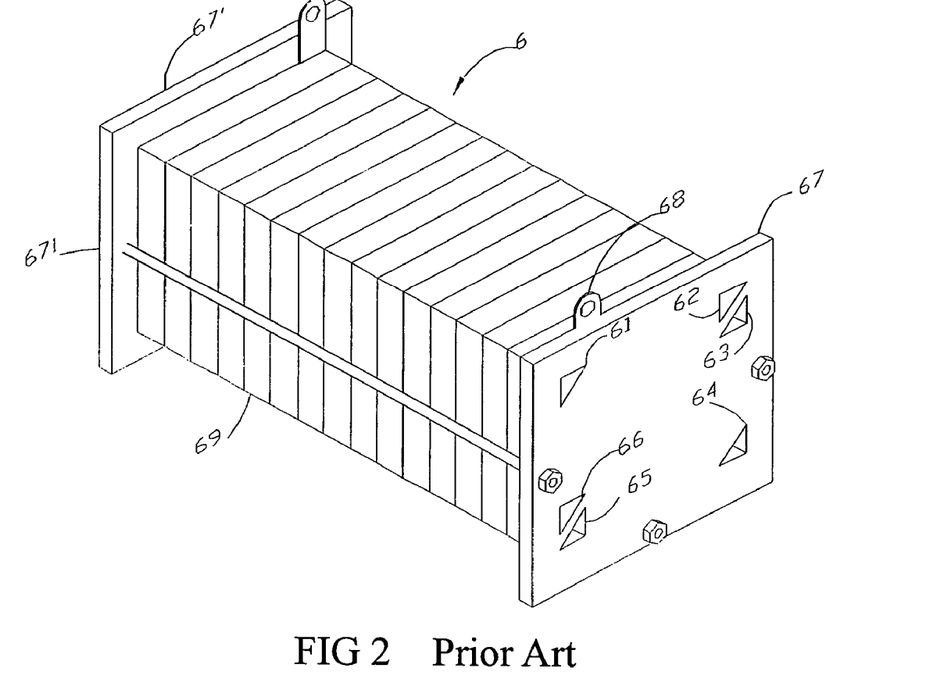
FIG. 2 is a schematic perspective view of a conventional PEM fuel cell stack.

This reaction in a single fuel cell 8 produces only limited volts. To get this voltage up to a desired level, many separate fuel cells must be combined to form a fuel-cell stack. Referring to FIG. 2, a type of conventional PEM fuel-cell stack 6 is illustrated. The fuel-cell stack 6 has a stack unit 69 including a plurality of single fuel cells 8 piled up together, a first end plate 67 and a second end plate 67' placed at a top side and a bottom side of the stack unit 69 respectively, a plurality of long insulate screws 671 pulling the first and second end plates 67, 67' closer with respect to each other so as to tightly sandwich the stack unit 69 for support, a pair of current collectors 68, 68' electrically connected to all anodes and cathodes, respectively, of all single fuel cell 8, and a plurality of manifolds and ports for carrying and directing reactants and coolant. The fuel-cell stack 6 as shown in FIG. 2 has six such manifolds and corresponding ports including a fuel inlet 63, an oxidant inlet 62, a coolant inlet 61, an exhausted fuel outlet 66, an exhausted oxidant outlet 65, and an exhausted coolant outlet 64, all of which are arranged on the second end plate 67'. Each such port 61, 62, 63, 64, 65, or 66 can be arranged on any end plate 67 or 67'. For some low-power fuel-cell stacks which do not need special cooling, the manifolds and corresponding ports for coolant supply and discharging can be saved. The end plates 67, 67' are generally required to be non-conductive and non-porous.

Figure 3:
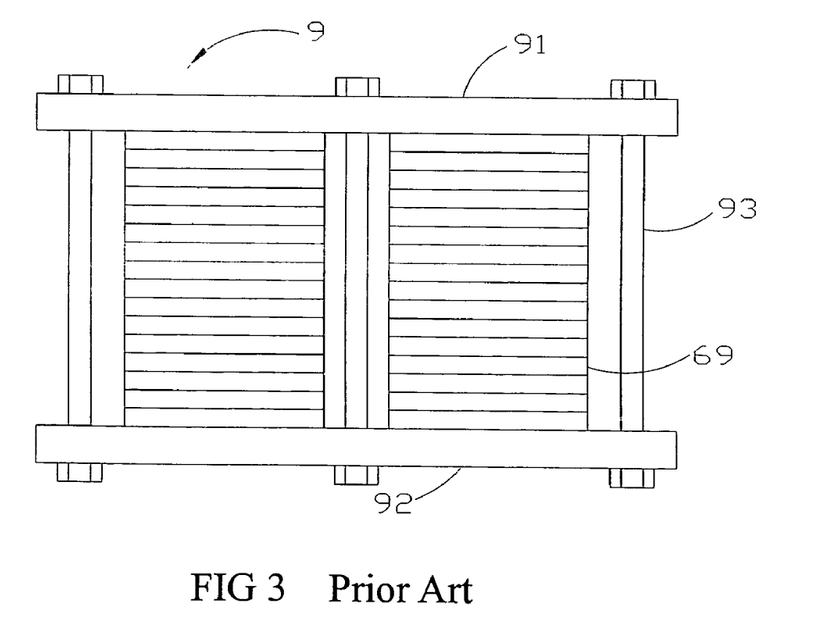
FIG. 3 is a schematic top view showing a conventional way for integration of fuel cell stacks.

In actual use, in order to achieve a voltage, a current, or a power which is much greater than one stack can does, more than one stacks need to be placed close together in terms of physical space, facilitating an electrical parallel or series connection. Such fuel cell stacks may be fueled by a common main hydrogen passage and a main air passage, and cooled down by common main water passages. This technology of establishing a multi-cell system is usually called integration of fuel cell stacks. FIG. 3 shows a typical conventional way of integration in which a multi-cell system 9 has a first end frame 91 and a second end frame 92 which sandwich more than one stack units 69 therebetween and are pulled towards each other by a plurality of bolts 93. A hydrogen supply passage, an air supply passage, and a water supply passage are defined in the first end frame 91, without communication with each other respectively for supplying the hydrogen, air, and cooling water needed by the stack units 69. A hydrogen discharge passage, an air discharge passage, and a water discharge passage for respectively discharging the hydrogen, air, and cooling water are defined in the second end frame 92. For each stack unit 69 in the multi-cell system, a hydrogen supply sub-passage, an air supply sub-passage, and a water supply sub-passage are defined in the first end frame 91 for air communication and connecting the hydrogen supply passage, the air supply passage, the water supply passage respectively to the hydrogen inlet, the air inlet, and the cooling water inlet. A hydrogen discharge sub-passage, an air discharge sub-passage, and a water discharge sub-passage are provided in the second end frame 92 in an air communicating manner to connect the hydrogen discharge passage, the air discharge passage, and the water discharge passage respectively to the hydrogen outlet, the air outlet, and the cooling water outlet of each stack unit 69. All passages and sub-passages do not communicate with each other.

However, such kind of integration has two main drawbacks. First, for a stack unit 69 made up by a certain number of single fuel cells 8, any flow must pass a whole length of the stack unit 69 from the first end frame 91 to the second end frame 92, making a pressure heads thereof drop substantially. In fact, pumps must be employed to provide the pressure required to overcome the loss of pressure head. It inevitably increases the weight, the manufacturing cost, and the power consumption of the whole equipment. Second, when one of the stack units 69 is out of work and needs to be disassembled and repaired, all bolts 93 must be loosened and one end plate 91 or 92 removed before the problem stack unit 69 can be taken out. It brings much inconvenience for using of such a multi-stack system.

SUMMARY OF THE PRESENT INVENTION

The main object of the invention is to provide an integral multi-stack system of fuel cell which is able to significantly reduce a length of a way that flows in the stack unit must pass through, and therefore an air pressure provided by an air blower instead of a pump will be enough to operate the system, providing a lower weight, manufacturing cost, and power consumption to the system.

Another object of the invention is to provide an integral multi-stack system of fuel cell in which each fuel cell stack is able to be detached simply and quickly for reparation or replacement without loosening and dismantling all the long insulate bolts.

Accordingly, in order to accomplish the above objects, the present invention provides an integral multi-stack system of fuel cell, comprising:

at least one pair of fuel cell stacks each having a stack unit combined by a certain number of single fuel cells, a first bus plate and a second bus plate respectively placed at a top side and a bottom side of the stack unit, and six ports on the first plate including a fuel inlet, an oxidant inlet, a coolant inlet, a fuel outlet, an oxidant outlet, and a coolant outlet, respectively used for fuel supplying, oxidant supplying, coolant supplying, exhausted fuel discharging, exhausted oxidant discharging, and exhausted coolant discharging for the stack unit;

a manifolding functional frame having a solid non-porous body having a plurality of main passages including a main fuel supply passage, a main oxidant supply passage, a main coolant supply passage, a main fuel discharging passage, a main oxidant discharging passage, and a main coolant discharging passage, all defined therein and being not communicated with one another, and two or more sets of sub-passages each of which is provided for engaging with one of the fuel cell stacks and each of which includes a fuel supply sub-passage, an oxidant supply sub-passage, a coolant supply sub-passage, a fuel discharging sub-passage, an oxidant discharging sub-passage, and a coolant discharging sub-passage, respectively communicating the main fuel supply passage, the main oxidant supply passage, the main coolant supply passage, the main fuel discharging passage, the main oxidant discharging passage, and the coolant discharging passage, without communicating with one another, to the fuel inlet, the oxidant inlet, the coolant inlet, the fuel outlet, the oxidant outlet, and the coolant outlet of the fuel cell stack; and an attaching means for firmly attaching the fuel cell stack to the body of the manifolding functional frame;

wherein when each of the fuel cell stacks is securely attached to the body of the manifolding functional frame, the fuel inlet, the oxidant inlet, the coolant inlet, the fuel outlet, the oxidant outlet, and the coolant outlet of the fuel cell stack are air communicating with the fuel supply sub-passage, the oxidant supply sub-passage, the coolant supply sub-passage, the fuel discharging sub-passage, the oxidant discharging sub-passage, and the coolant discharging sub-passage of the manifolding functional frame respectively, making the main passages and the sub-passages be able to be used to supply and/or discharge gas or liquid being used by all the fuel cell stacks integrated.

These and other objectives, features, and advantages of the present invention will become apparent from the following detailed description, the accompanying drawings, and the appended claims.

DETAILED DESCRIPTION OF THE PREFERRED EMBODIMENT

Figure 4:
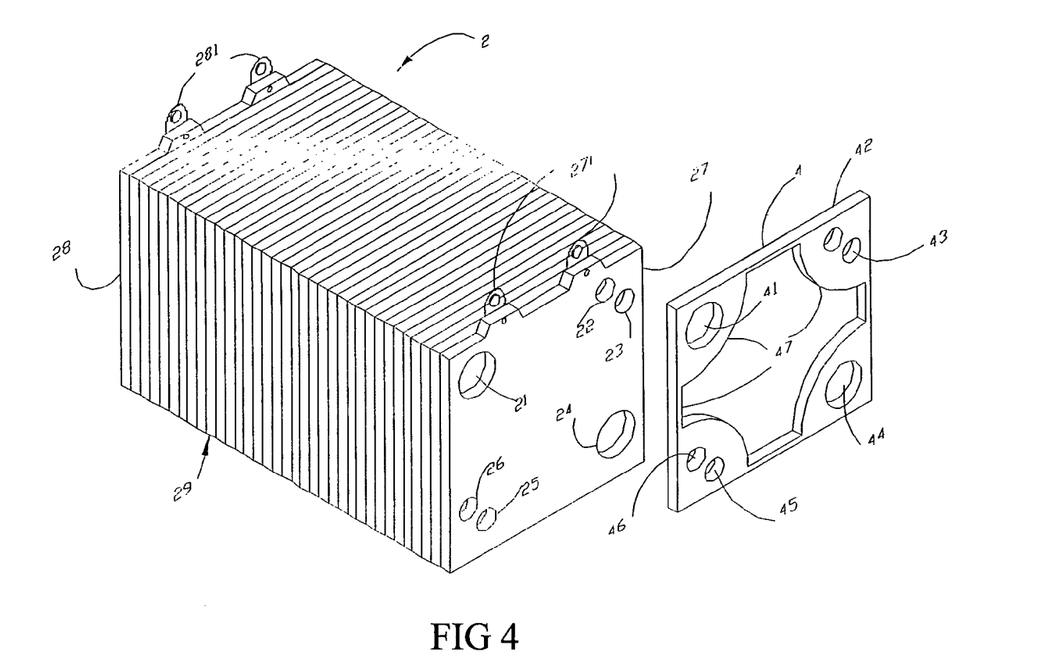
FIG. 4 is a schematic perspective exploded view of a PEM fuel cell stack according to a preferred embodiment of the present invention.
Figure 5:
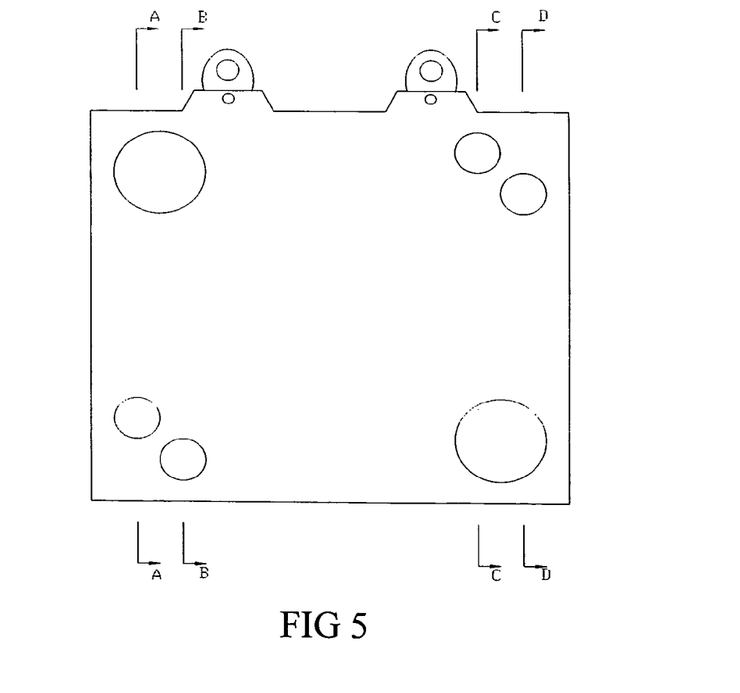
FIG. 5 is a side view of the stack unit of the preferred embodiment as shown in FIG. 4.
Figure 6:
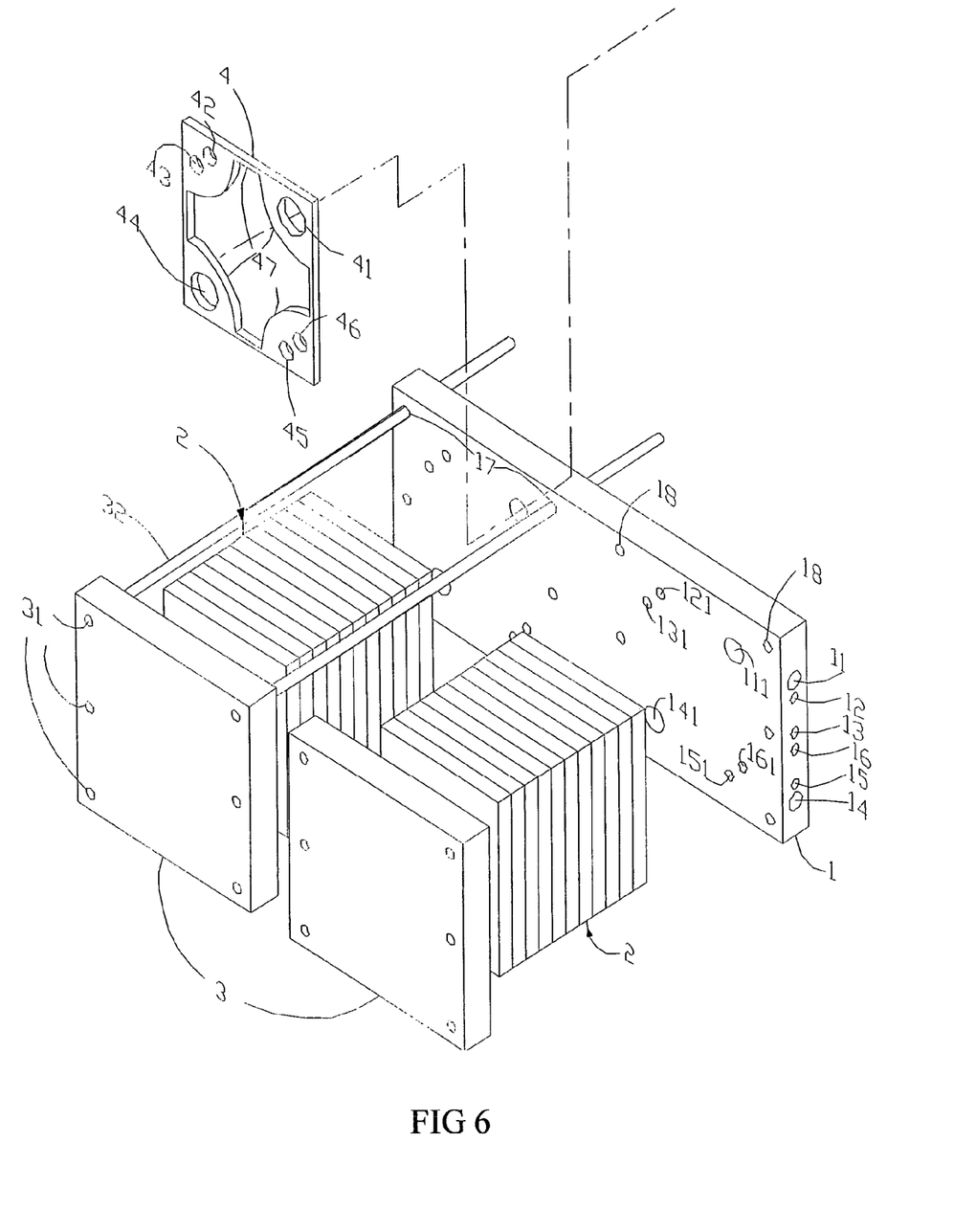
FIG. 6 is a schematic perspective exploded view showing an integral multi-stack system of fuel cell according to the above preferred embodiment of the present invention.

Referring to FIGS. 4, 5, and 6, an integral multi-stack system of fuel cell according to a preferred embodiment of the invention is illustrated. The system has at least one pair of proton exchange membrane PEM fuel cell stacks 2, a manifolding functional frame 1 for supporting the fuel cell stacks 2 and for supplying and discharging reactants and coolant used by the fuel cell stacks 2, a sealing plate 4 for fluid tightly connecting each fuel cell stack 2 to the manifolding functional frame 1, and a pair of end plates 3 which are pulled towards the manifolding functional frame by a plurality of long insulate bolts 31 passing through a plurality of corresponding screw holes 18 provided in the manifolding functional frame 1 so as to sandwich the pair of fuel cell stacks 2 between the end plates 3 and the manifolding functional frame 1.

Referring to FIGS. 4 and 5, the fuel-cell stack 2 comprises a stack unit 29 including a predetermined number of single fuel cells piled up together forming a bottom side and a top side. The fuel-cell stack 2 further includes a first bus plate 27 and a second bus plate 28 placed at two opposing sides of the stack unit 29 respectively. The first bus plate 27 has six ports including a fuel inlet 23, an oxidant inlet 22, a coolant inlet 21, a fuel outlet 26, an oxidant outlet 25, and a coolant outlet 24, which are respectively used for fuel supplying, oxidant supplying, coolant supplying, exhausted fuel discharging, exhausted oxidant discharging, and exhausted coolant discharging for the stack unit 29. At least one electric collector 271 or 281 is electrically connected to each bus plate 27 or 28.

The sealing plate 4 has six openings, including a first fuel opening 43, a first oxidant opening 42, a first coolant opening 41, a second fuel opening 46, a second oxidant opening 45, and a second coolant opening 44, which are able to respectively align with the fuel inlet 23, the oxidant inlet 22, the coolant inlet 21, the fuel outlet 26, the oxidant outlet 25, and the coolant outlet 24 in the first bus plate 27 when the fuel-stack 2 is placed thereon with the first bus plate intimately contacts to the sealing plate 4. A rubber sealing ring 47 is attached on each surface of the sealing plate 4 surrounding each opening 41, 42, 43, 44, 45, and 46 thereof.

Figure 7:
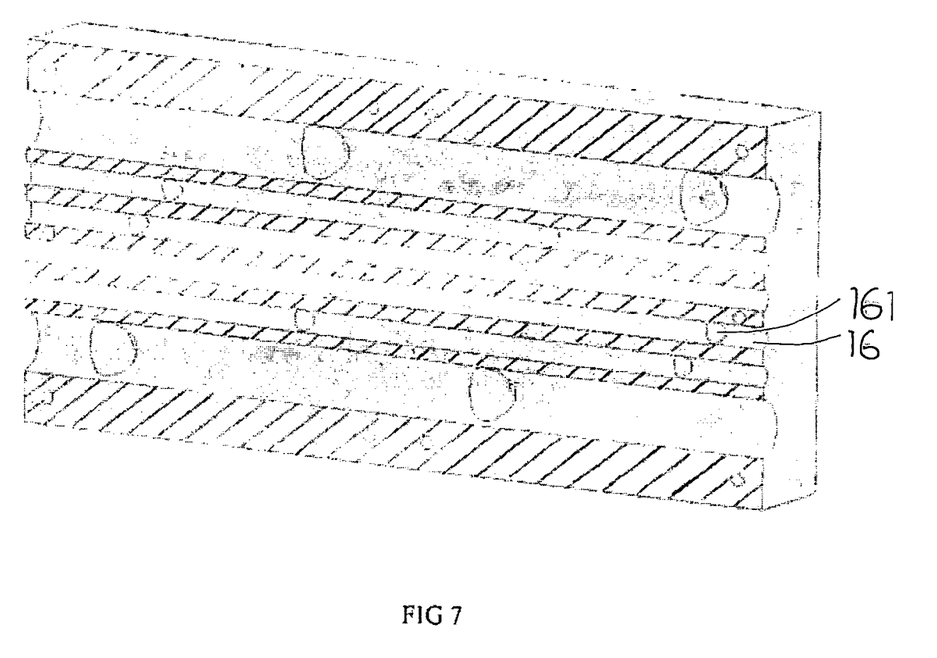
FIG. 7 is a perspective cross-sectional view cut along the A-A line as shown in FIG. 5.
Figure 8:
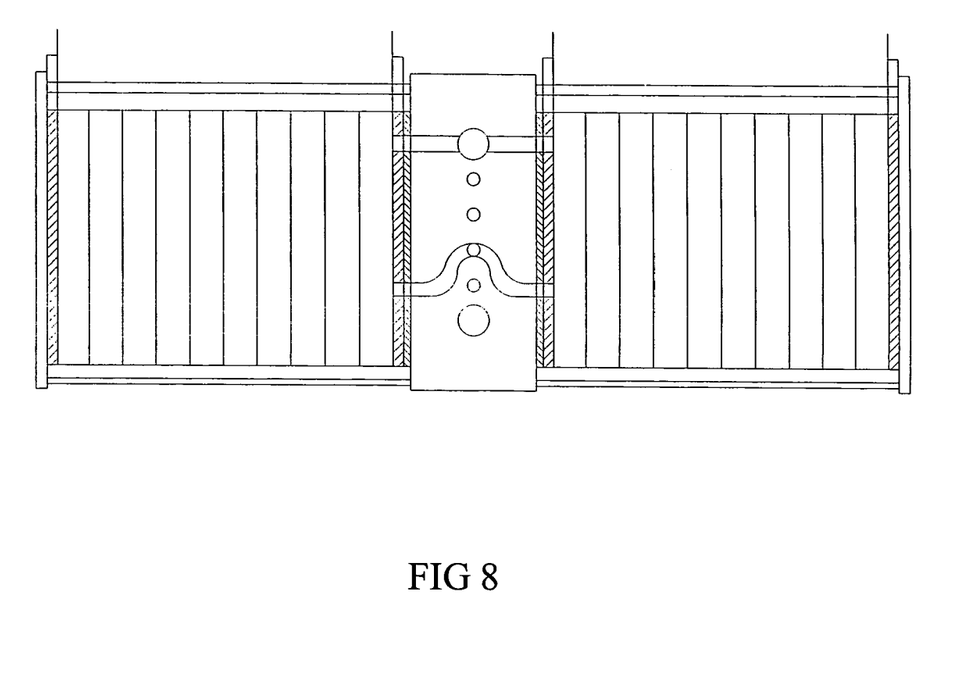
FIG. 8 is partial cross-sectional views respectively cut along the A-A, B-B, and C-C lines as shown in FIG. 5.

Referring to FIGS. 6, 7 and 8, the manifolding functional frame 1 is a solid non-porous body having a plurality of main passages defined therein, wherein the main passages include a main fuel supply passage 13, a main oxidant supply passage 12, a main coolant supply passage 11, a main fuel discharging passage 16, a main oxidant discharging passage 15, and a main coolant discharging passage 14, which are not communicated with one another. Each of more than one sets of sub-passages is provided for engaging with one fuel cell stack 2 and includes a fuel supply sub-passage 131, an oxidant supply sub-passage 121, a coolant supply sub-passage 111, a fuel discharging sub-passage 161, an oxidant discharging sub-passage 151, and a coolant discharging sub-passage 141 which are respectively communicating the main fuel supply passage 13, the main oxidant supply passage 12, the main coolant supply passage 11, the main fuel discharging passage 16, the main oxidant discharging passage 15, and the main coolant discharging passage 14 to an installation face 17 on the body of the manifolding functional frame 1 without communicating with one another.

In installation, a user can first insert all the long insulate bolts 32 through respective screw hole 31 in one of the pair of the end plates 3 and then levelly place the end plate 3 on a table, with all the bolts 32 extending upright. Then one fuel cell stack 2 can be placed on the end plate 3, being surrounded by the bolts 32 and the second bus plate 28 thereof contacting the end plate 3. The user can then attach a pair of sealing plate 3 to two opposite installation faces 17 by screws, with the fuel supply sub-passage 131, the oxidant supply sub-passage 121, the coolant supply sub-passage 111, the fuel discharging sub-passage 161, the oxidant discharging sub-passage 151, and the coolant discharging sub-passage 141 of the manifolding functional frame 1 communicating to the first fuel opening 43, the first oxidant opening 42, the first coolant opening 41, the second fuel opening 46, the second oxidant opening 45, and the second coolant opening 44 of the sealing plate 4 respectively.

Then the user can hold the manifolding functional frame 1 close to the fuel cell stack 2, with all through openings 18 formed in the manifolding functional frame 1 being aligned with respect to the long insulate bolt 32. Then, the user can push the manifolding functional frame 1 until all the bolts 32 are inserted into the openings 18 respectively and the sealing plate 4 finally meets the first bus plate 27 of the fuel cell stack 2. Then, the user can put the other of the pair of fuel cell stacks 2 on the other sealing plate 4 attached to the opposite installation face 17, with the first bus plate 27 thereof being contacting with the other sealing plate 4. The user can put another end plate 3 onto the second bus plate 28, with free ends of all the long insulate bolts 32 passing through the screw holes 31 therein respectively. Finally, apply bolt nuts to the bolts and rotate the bolt nuts until the pair of end plates 3 tightly sandwiches the pair of fuel cell stacks 2 therebetween.

Through the same way, a user can assemble other more pairs of fuel cell stacks 2 to the manifolding functional frame 1. After such assembly, sub-passages 111, 121, 131, 141, 151, and 161 in each set are aligned to the openings 41, 42, 43, 44, 45, and 46 of one sealing plate 4 and the ports 21, 22, 23, 24, 25, and 26 of one fuel cell stack 2. A flow of fuel is able to access each fuel cell stack 2 from the main fuel supply passage 13, through each fuel supply sub-passage 131, each first fuel opening 43, and each fuel inlet 23. An oxidant flow is able to access each fuel cell stack 2 from the main oxidant supply passage 12, through each oxidant supply sub-passage 121, each first oxidant opening 42, and each oxidant inlet 22. A flow of coolant is able to access each fuel cell stack 2 from the main coolant supply passage 11, through each fuel supply sub-passage 111, each first coolant opening 41, and each coolant inlet 21, and is able to take away the heat generated by the fuel cell stack 2 through each coolant outlet 24, each second coolant opening 44, and each coolant discharge sub-passage 141, to the main coolant discharge passage 14. A flow of exhausted fuel is discharged to the main fuel discharge passage 16 through each fuel outlet 26, each second fuel opening 46, and each fuel discharge sub-passage 161. A flow of exhausted oxidant is discharged to the main oxidant discharge passage 15 through each oxidant outlet 25, each second oxidant opening 45, and each oxidant discharge sub-passage 151. The rubber sealing ring 47 attached on each surface of the sealing plate 4 surrounding each opening 41, 42, 43, 44, 45, and 46 thereof is able to improve protection for leakage between the fuel cell stack 2 and the installation surface 17 of the manifolding functional frame 1.

According to above described process of installation, more than one pair of fuel cell stacks 2 are able to be similarly attached onto the manifolding functional frame 1 corresponding to different sets of sub-passages 111, 121, 131, 141, 151, and 161 to establish an integral multi-stack system. The integral multi-cell system of the embodiment as shown in FIG. 6 has four fuel cell stacks 2 symmetrically installed. It could be seen that according to the spirit of the invention, more than one pair of fuel sell stacks 2 are able to be installed. Any existing set of the sub-passages 111, 121, 131, 141, 151, and 161 or any individual sub-passage 111, 121, 131, 141, 151, or 161 that is engaged with the fuel cell stack 2 is able to be fluid-tightly sealed by inserting one or more plugs (not shown in the Figures) therein. A cap that is able to threadedly engage with the end of an individual sub-passage 111, 121, 131, 141, 151, or 161 with a sealing ring may be better in terms of a securer sealing effect.

In the preferred embodiment of the invention, all the passages 11, 12, 13, 14, 15, and 16 are round cross-sectional strait through passages extended from one face of the manifolding functional frame 1 to another opposite face. They can be any other cross-sectional shape and be not so strait as long as they are able to convey and guide fuel, oxidant, or coolant for the fuel cell stacks 2. And, they do not have to be through passages as long as each of them is able to reach and communicate with each sub-passage for which it supplies or discharges gas or liquid. The benefit of through passage is that it is able to provide a user an option to select an end of the passage 11, 12, 13, 14, 15, or 16 through which each gas or liquid should be supplied or discharged for the fuel cell stacks 2.

For example, the user can choose either to supply or discharge gas and/or liquid at one end of the passage 11, 12, 13, 14, 15, or 16, or to supply gas and/or liquid at one end but discharge them at the opposite end. A passage fitting can be provided for each passage 11, 12, 13, 14, 15, and 16, facilitating its access to peripheral equipment. An idle end which is not used for supplying or discharging gas and/or liquid therethrough can be air-tightly sealed by plugging a non-porous plug. A cap that is able to threadedly engage with the end of the passage with a sealing ring may achieve a securer sealing effect.

The fuel cell stack 2 may be securely attached to the manifolding functional frame 1 by some other ways other than the one aforementioned in the preferred embodiment. Therefore, the fuel cell stack 2 may be fittedly put into a tough box first and the box, which has screw holes, is able to be attached to the manifolding functional frame 1 by the long insulate bolts. Yet another way of attachment is using a tough belt wrapping round the fuel cell stack 2 and then securely attach the belt to the manifolding functional frame 1 with long insulate bolts.

Detaching a fuel cell stack 2 for reparation or replacement is also simple and quick, without disconnecting such sub-passages 911, 921, 931, 941, 951, and 961 one by one.

The most common fuel and oxidant used by above PEM fuel cell stacks 2 are hydrogen and air respectively. Sometimes pure oxygen is used as oxidant. Although theoretically any liquid that is able to take heat away from the fuel cell stacks 2 can act as coolant, water or a mixture of ethylene glycol and water are usually the first choice due to their low causticity and low cost.

For some low-power fuel-cell stacks which do not need special cooling, the passages and corresponding sub-passages for coolant supply and discharging can be saved. Although it is not strictly required, the body of the manifolding functional frame 1 is better non-conducting besides non-porous, rigid, and machineable, presenting a higher safety therefor.

In view of above, it is apparent that, for a stack unit 29 made up of the same quantity of single fuel cells as a conventional integral multi-stack system, any flow passes only about half way from the main supply passage 11, 12, or 13 to the main discharge passage 14, 15, or 16. Such configuration of an integral multi-stack system of fuel cell of the present invention brings two main advantages in use. Firstly, loss of pressure head of every flow is substantially reduced and therefore an air pressure provided by an air blower instead of a pump will be enough to operate the system. It lowers the weight, manufacturing cost, and power consumption to the system. Secondly, each fuel cell stack 2 is able to be detached simply and quickly for reparation or replacement without affecting other separated stack units 29.

Figure 9:
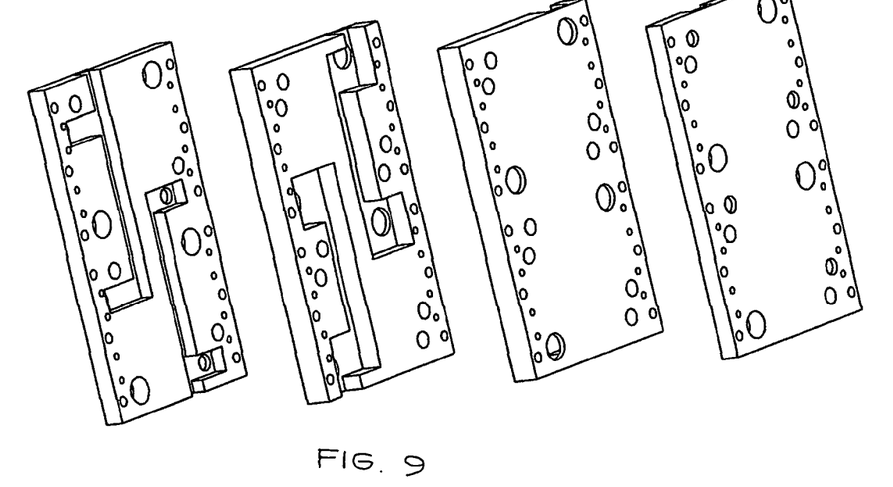
FIG. 9 is a front exploded perspective view of an alternative mode of the stack unit according to the above preferred embodiment of the present invention.
Figure 10:
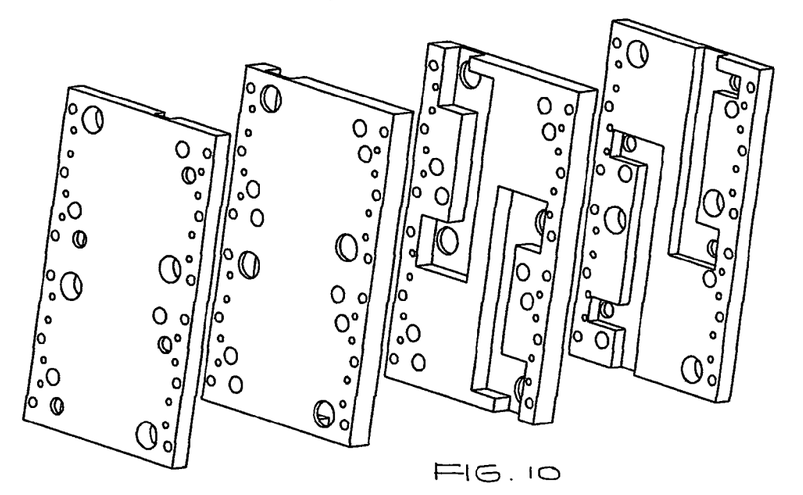
FIG. 10 is a rear exploded perspective view of the alternative mode of the stack unit according to the above preferred embodiment of the present invention.
Figure 11:
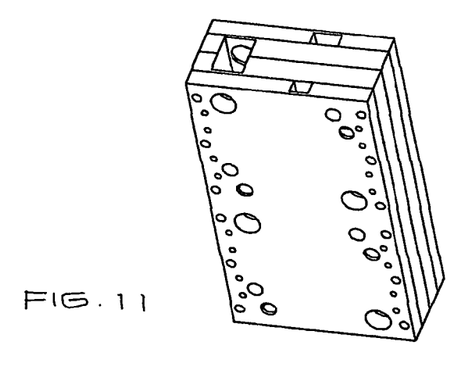
FIG. 11 is a perspective view of the alternative mode of the stack unit according to the above preferred embodiment of the present invention.

FIGS. 9 to 11 illustrate an alternative mode of the stack unit according to the above preferred embodiment of the present invention.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An integral multi-stack system of fuel cell, comprising:
a plurality of fuel cell stacks, each of which comprises a fuel inlet port, an oxidant inlet port, a coolant inlet port, a fuel outlet port, an oxidant outlet port, and a coolant outlet port which are used for fuel supplying, oxidant supplying, coolant supplying, exhausted fuel discharging, an exhausted oxidant discharging, and a coolant discharging for said stack unit respectively; and
a manifolding functional frame, which comprises:
a non-porous body which is provided between said fuel cell stacks for transversely and spacedly mounting said fuel cell stacks at two sides of said non-porous body, and comprises a main fuel supply passage defining a main fuel inlet at a first side of said non-porous body, a main oxidant supply passage defining a main oxidant inlet at said first side of said non-porous body, a main coolant supply passage defining a main coolant inlet at said first side of said non-porous body, a main fuel discharging passage defining a main fuel outlet at a second side of said non-porous body which is opposed to said first side, a main oxidant discharging passage defining a main oxidant outlet at said second side of said non-porous body, and a main coolant discharging passage defining a main coolant outlet at said second side of said non-porous body, wherein said main fuel supply passage, said main oxidant supply passage, said main coolant supply passage, said main fuel discharging passage, said main oxidant discharging passage, and said main coolant discharging passage are longitudinally extended along said non-porous body,
wherein said non-porous body further comprises a fuel supply sub-passage communicating said fuel supply passage with each of said fuel inlet ports, an oxidant supply sub-passage communicating said main oxidant supply passage with each of said oxidant inlet ports, a coolant supply sub-passage communicating said main coolant supply passage with each of said coolant inlet ports, a fuel discharging sub-passage communicating said main fuel discharging passage with each of said fuel outlet ports, an oxidant discharging sub-passage communicating said main oxidant discharging passage with each of said oxidant outlet ports, and a coolant discharging sub-passage communicating said main coolant discharging passage with each of said coolant outlet ports, wherein a supply and a discharge of said fuel, oxidant and coolant are spacedly provided on two ends of said non-porous body respectively, so that for each of said fuel cell stacks, a material flow of said fuel, said oxidant and said coolant between said fuel inlet port and said fuel outlet port, said oxidant inlet port and said oxidant outlet port, and said coolant inlet port and said coolant outlet port respectively are independent from said other fuel cell stacks so as to simplify a flow network within said fuel cell and to minimize a flow impedance and energy loss thereof.

2. The integral multi-stack system of fuel cell, as recited in claim 1, further comprising an attaching means for firmly attaching said fuel cell stack to said body of said manifolding functional frame, wherein when each said fuel cell stack is securely attached to said body of said manifolding functional frame, said fuel inlet, said oxidant inlet, said coolant inlet, said fuel outlet, said oxidant outlet, and said coolant outlet of said fuel cell stack are capable of air-communicating with said fuel supply sub-passage, said oxidant supply sub-passage, said coolant supply sub-passage, said fuel discharging sub-passage, said oxidant discharging sub-passage, and said coolant discharging sub-passage of said manifolding functional frame so as to make said main passages and said sub-passages to be used to selectively supply and discharge gas and liquid used by said fuel cell stacks integrated.

3. The integral multi-stack system of fuel cell, as recited in claim 2, wherein said attaching means comprises a pair of end plates being pulled towards each other by a plurality of long insulate bolts passing through a plurality of corresponding screw holes formed in said manifolding functional frame so as to sandwich said pair of fuel cell stacks between said end plates in a replaceable manner.

4. The integral multi-stack system of fuel cell, as recited in claim 1, wherein said integral multi-stack system of fuel cell further has a sealing plate for fluid tightly connecting each said fuel cell stack to said manifolding functional frame.

5. The integral multi-stack system of fuel cell, as recited in claim 4, wherein said end plate has a plurality of openings including a first fuel opening, a first oxidant opening, a first coolant opening, a second fuel opening, a second oxidant opening, and a second coolant opening which are aligned with said fuel inlet port, said oxidant inlet port, said coolant inlet port, said fuel outlet port, said oxidant outlet port, and said coolant outlet port respectively when said fuel-stack is placed thereon, and a rubber sealing ring attached on each surface of the sealing plate surrounding each said opening thereof.

6. The integral multi-stack system of fuel cell, as recited in claim 5, wherein said attaching means comprises a pair of end plates being pulled towards each other by a plurality of long insulate bolts passing through a plurality of corresponding screw holes defined in said manifolding functional frame so as to sandwich each pair of fuel cell stacks therebetween.

7. The integral multi-stack system of fuel cell, as recited in claim 1, wherein said fuel is hydrogen and said oxidant is air or pure oxygen.

8. The integral multi-stack system of fuel cell, as recited in claim 1, wherein a passage fitting is provided for each said main passage to facilitate an access thereof to peripheral equipment.

9. The integral multi-stack system of fuel cell, as recited in claim 5, wherein a passage fitting is provided for each said main passage to facilitate an access thereof to peripheral equipment.

10. The integral multi-stack system of fuel cell, as recited in claim 7, wherein a passage fitting is provided for each said main passage to facilitate an access thereof to peripheral equipment.

11. The integral multi-stack system of fuel cell, as recited in claim 1, wherein said main passages are through passages through said non-porous body of said manifolding functional frame with one end thereof is sealed.

12. The integral multi-stack system of fuel cell, as recited in claim 5, wherein said main passages are through passages through said non-porous body of said manifolding functional frame with one end thereof is sealed.

13. The integral multi-stack system of fuel cell, as recited in claim 10, wherein said main passages are through passages through said non-porous body of said manifolding functional frame with one end thereof is sealed.

\* \* \* \* \*